United States Patent
Yamagata et al.

(10) Patent No.: US 6,332,998 B1
(45) Date of Patent: Dec. 25, 2001

(54) METHOD FOR MAKING MOLDING PARTS USING HEAT-CURABLE MOLDING COMPOSITIONS

(75) Inventors: Yoshikazu Yamagata, Katano; Fumitoshi Yamashita, Ikoma; Hiroshi Onishi, Hirakata; Takahiko Terada, Nara, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/556,320

(22) Filed: Apr. 24, 2000

Related U.S. Application Data

(62) Division of application No. 09/083,427, filed on May 21, 1998, now abandoned.

(30) Foreign Application Priority Data

May 30, 1997 (JP) .................................................... 9-141947

(51) Int. Cl.[7] .............................. B29C 35/08; B29C 70/70
(52) U.S. Cl. ................. 264/496; 264/272.19; 264/272.2; 29/605
(58) Field of Search .................................. 264/494, 496, 264/272.2, 272.19, 236; 29/605, 606

(56) References Cited

U.S. PATENT DOCUMENTS

| | | | |
|---|---|---|---|
| 2,937,408 | * 5/1960 | Limpel | 264/272.2 |
| 3,626,051 | * 12/1971 | Liautaud | 264/272.19 |
| 3,633,140 | * 1/1972 | Lake | 264/272.19 |
| 3,760,033 | 9/1973 | Arbuckle | 525/48 |
| 4,134,884 | * 1/1979 | Takiyama et al. | 260/861 |
| 4,460,535 | * 7/1984 | Kitoh et al. | 264/272.19 |
| 4,576,768 | * 3/1986 | Markert et al. | 264/27 |
| 4,579,890 | 4/1986 | Domeier | 523/512 |
| 4,635,348 | * 1/1987 | Van Zyl | 29/596 |
| 5,589,129 | 12/1996 | Kato | 264/437 |

FOREIGN PATENT DOCUMENTS 6-304930 A 11/1994 (JP) .

* cited by examiner

*Primary Examiner*—Angela Ortiz
(74) *Attorney, Agent, or Firm*—Parkhurst & Wendel, LLP

(57) ABSTRACT

A molding composition containing an unsaturated alkyd resin and an unsaturated polyester containing a crosslinking monomer, which may be 2-hydroxyethyl acrylate or 2-hydroxyethyl methacrylate. A molded part is manufactured by (a) covering the surrounding of a stator part having a heat generating coil with the molding composition, (b) feeding power to the coil for generating heat in the stator part, and (c) curing the molding composition by the heat generated in the stator part. The curing time is shortened, the molding cycle is improved, and, as a result, a molding composition excellent in productivity is presented, and by using this molding composition, molded parts are manufactured at excellent productivity.

4 Claims, 1 Drawing Sheet

METHOD FOR MAKING MOLDING PARTS USING HEAT-CURABLE MOLDING COMPOSITIONS

This is a Division of application Ser. No. 09/083,427 filed May 21, 1998 now abandoned.

TECHNICAL FIELD OF THE INVENTION

The present invention relates to a molding composition, molded parts made therefrom, and a method of manufacturing molded parts.

BACKGROUND OF THE INVENTION

Hitherto, the method of manufacturing molded parts buried in a thermosetting resin involves the steps of:

(1) putting parts to be buried into a heated die, (2) filling the die containing the parts with a curable thermosetting resin molding material by either an injection method or a transfer method to cover the parts with the resin, (3) curing the thermosetting resin in the die by heating to a temperature above the reaction starting temperature, and (4) finally completely curing to finish the curing reaction, and removing the molded parts from the die.

In order to shorten the curing time and enhance productivity, it is necessary to raise the temperature of the molding material as promptly as possible above the reaction starting temperature. To this purpose, by preliminarily heating either the parts to be buried or the molding material, one hopes to decrease the curing time.

In the known conventional method of preliminarily heating the parts to be buried, when the parts are heated to a temperature close to the reaction starting temperature of the thermosetting resin, curing starts during the step of injecting the mold into the die in which the heated parts are placed. As such, the molding material is not completely injected into the die, or the molding material is not completely charged into the parts. Or, the cured molded parts are cracked, and complete molded parts are not obtained. Thus, the preliminary heating temperature of the parts to be buried cannot be raised too high.

Moreover, the reaction starting temperature and the curing time of the thermosetting resin depend greatly on the type of polymerization initiating agent, such as a peroxide, added to the resin. Hence the curing time can be controlled by selecting the type of polymerization initiating agent. However, the polymerization initiating agent to decrease the curing time generally causes a simultaneous drop in the reaction starting temperature. This means that the storage period of the molding material is shorter, and the storage stability of the molding material is inferior.

It is hence an object of the present invention to provide a molding composition having enhanced productivity and a method of manufacturing molded parts from that molding composition.

SUMMARY OF THE INVENTION

The molding composition of the present invention includes:

an unsaturated alkyd resin, and a crosslinking monomer to be crosslinked to the unsaturated alkyd resin, in which the crosslinking monomer includes a first crosslinking monomer having a [C=C] group, a [—$CO_2$—] group and a [—OH] group. These groups are, respectively, an ethylenically unsaturated group, a carboxyl group, and a hydroxy group.

A molded part of the present invention includes:

(a) a cured resin resulting from curing a molding composition comprising
  (1) an unsaturated alkyd resin, and
  (2) a crosslinking monomer to be crosslinked to the unsaturated alkyd resin, in which the crosslinking monomer includes a first crosslinking monomer having a [C=C] group, a [—$CO_2$—] group, and a [—OH] group, and (b) an electronic component covered with the cured resin (a).

A method of manufacturing a molded part of the present invention from the corresponding molding composition comprises the following steps:

(a) covering with a molding composition the outside of an electronic component that can be heated, (b) feeding power to the electronic component to generate heat in the electronic component, and (c) curing the molding composition using the heat generated in the electronic component.

Preferably, the first crosslinking monomer is at least one of 2-hydroxyethyl acrylate and 2-hydroxyethyl methacrylate.

Preferably, the electronic component has a coil formed by winding a conductive wire, and the coil generates heat as power is fed to the coil.

In this construction the molding composition curing time is decreased. Moreover, the productivity of the manufacture of molded parts is enhanced.

DETAILED DESCRIPTION OF THE INVENTION

Figure 1:
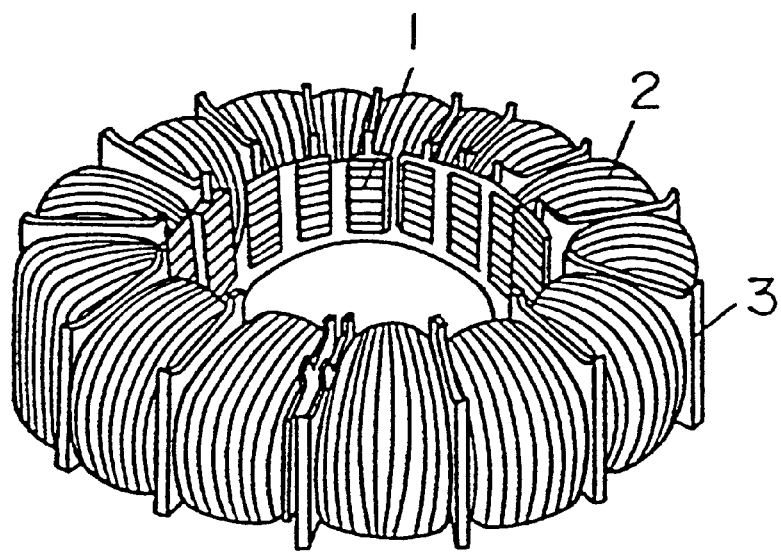
FIG. 1 is a schematic perspective view of a stator of a motor used in a method of manufacturing molded parts in one embodiment of the invention.

A molding composition of the present invention includes:

an unsaturated alkyd resin, and a crosslinking monomer to be crosslinked to the unsaturated alkyd resin, in which the crosslinking monomer includes a first crosslinking monomer having a [C=C] group, a [—$CO_2$—] group, and a [—OH] group. As previously mentioned, these groups are an ethylenically unsaturated group, a carboxyl group, and a hydroxyl group, respectively.

A molded part of the present invention includes:

(a) a cured resin resulting from curing a molding composition comprising
  (1) an unsaturated alkyd resin, and
  (2) a crosslinking monomer to be crosslinked to the unsaturated alkyd resin, in which the crosslinking monomer includes a first crosslinking monomer having a [C=C] group, a [—$CO_2$—] group, and a [—OH] group, and (b) an electronic component covered with the cured resin.

A method of manufacturing a molded part of the present invention comprises the steps of:

(a) covering with a molding composition the outside of an electronic component that can be heated,
(b) feeding power to the electronic component to generate heat in the electronic component, and
(c) curing the molding composition using the heat generated in the electronic component.

Preferably, the electronic component has a coil formed by winding a conductive wire, and the coil generates heat as power is fed to the coil.

Preferably, the first crosslinking monomer having a [C=C] group, a [—CO$_2$—] group, and a [—OH] group has a [C=CCO2—] group and a [—OH] group. In this embodiment, the crosslinking monomer still has each of an ethylenically unsaturated group, a carboxyl group, and a hydroxy group.

Preferably, the first crosslinking monomer is at least one of 2-hydroxyethyl acrylate and 2-hydroxyethyl methacrylate.

Preferably, the crosslinking monomer further includes a second crosslinking monomer containing styrene.

Preferably, the quantity of the first crosslinking monomer ranges from about 1 mol. % to about 80 mol. % of the total crosslinking monomer.

Preferably, the total content of styrene and first crosslinking monomer is about 90 mol. % or more of the total crosslinking monomer.

Preferably, the molding composition includes at least one member selected from the group consisting of a reaction initiator, a filler, a reinforcing material, a low shrinking agent, coloring matter, a thickener, and a mold release agent.

In the present invention, the composition containing the unsaturated alkyd resin and crosslinking monomer is called an unsaturated polyester.

The unsaturated polyester in the present invention is not particularly limited, but may be, for example, an unsaturated polyester comprising an unsaturated alkyd generated by reacting unsaturated polybasic acid, saturated polybasic acid and glycols; a crosslinking monomer may also be used.

An ethylenically unsaturated group (that is, the C=C group) in the chemical structure of the unsaturated alkyd polymerizes with an ethylenically unsaturated group (that is, the C=C group) of the crosslinking monomer to generate a crosslinked cured resin. Representative unsaturated polybasic acids include maleic anhydride, fumaric acid, and itaconic acid.

Representative saturated polybasic acids (anhydrides also embraced within this definition) include phthalic anhydride, isophthalic acid, terephthalic acid, tetrahydrophthalic anhydride, methyl tetrahydrophthalic anhydride, endomethylene tetrahydrophthalic anhydride, tetrabromophthalic anhydride, adipinic acid, and sebacic acid.

Exemplary glycols include propylene glycol, ethylene glycol, diethylene glycol, dipropylene glycol, neopentyl glycol, dibromoneopentyl glycol, 1,3-butane diol, 1,4-butane diol, and hydrogenated bisphenol A.

Both 2-hydroxyethyl acrylate and 2-hydroxyethyl methacrylate are crosslinking monomers including a [C=C] group, a [—CO$_2$—] group and a [—OH] group, which crosslink with the unsaturated alkyd and are able to decrease the curing time of the composition.

In addition to the unsaturated alkyd resin and crosslinking monomer, it is also possible to include in the molding composition other crosslinking monomers such as methyl methacrylate, vinyl acetate, vinyl toluene, alpha-methyl styrene, and methyl acrylate. Of these monomers, styrene is preferred, and this composition has an excellent crosslinking reaction and low cost.

The quantity of 2-hydroxyethyl acrylate or 2-hydroxyethyl methacrylate contained in the crosslinking monomer preferably ranges from about 1 mol. % to less than about 80 mol. %, and most preferably 30 to 70 mol. % of the total crosslinking monomer. If the amount of 2-hydroxyethyl acrylate or 2-hydroxyethyl methacrylate in the crosslinking monomer is less than about 1 mol. %, the effect on decreasing the curing time is small. If these crosslinks are present in an amount of more than about 80 mol. % of the total crosslinking monomer, the effect on decreasing the curing time is small also.

When the composition contains at least one of 2-hydroxyethyl acrylate and 2-hydroxyethyl methacrylate, styrene and other crosslinking monomer(s), the total of the hydroxyacrylate compound and styrene in the total crosslinking monomer composition is particularly preferred to be 90 mol. % or more. In this instance, the molding composition is inexpensive, has an excellent crosslinking property, and is simultaneously capable of decreasing the curing time.

In cases where the total crosslinking monomer composition contains 10 mol. % or more of crosslinking monomer(s) other than the hydroxyacrylate compound and styrene, the effect on decreasing the curing time by the hydroxyacrylate may be reduced, or the resin may be likely to be left over in the die; other problems may occur also.

The total amount of the crosslinking monomer is preferred to be about 1.3 times to about 5 times by molar ratio to the unsaturated polybasic acid. If the molar ratio of the crosslinking monomer to the unsaturated polybasic acid is less than about 1.3, the unreacted portion of the unsaturated polybasic acid increases, which results in a decline in molding strength or in a plastic molding using its composition as a binder. If the molar ratio of the crosslinking monomer to the unsaturated polybasic acid is more than about 5, much unreacted monomer remains, causing the strength of the plastic molding to be lowered.

It is also possible to mix additives such as filler, reinforcing material, low shrinking agent, reaction initiator, coloring matter, thickener, and mold release agent in the molding composition.

Examples of the filler include powders of, among others, calcium carbonate, calcium silicate, magnesium carbonate, barium sulfate, calcium sulfate, kaolin, aluminum hydroxide, talc, mica, diatomaceous earth, and glass. The shape of the powder is not particularly limited for use in the present invention.

As the reinforcing material, glass fiber, ceramic fiber, carbon fiber, organic fiber or the like may be used.

Representative organic fibers include vinylon, polypropylene, polyester, and aramid fiber.

As the carbon fiber, a baked composition of polyacrylonitrile, rayon or the like may be used.

Examples of the low shrinking agent include, among others, polystyrene, polycaprolactone, polydipropylene adipate, and polydipropylene isophthalate.

Examples of the reaction initiator include, among others, t-butyl peroctanate, benzoyl peroxide, t-butyl perbenzoate, 2,2, bis(t-butyl peroxy)butane, and 3,3,5, trimethyl(t-butyl peroxy)cyclohexane.

As the coloring matter, general dyes or pigments may be used, for example, iron oxide, titanium oxide, cadmium yellow, cadmium red, chrome yellow, chrome vermilion, ultramarine, other inorganic pigments, azo compounds, cyanine blue, chlorinated cyanine blue, cyanine green, other organic pigments, indigo red, oil red, other dyes, and carbon black.

Examples of the thickener include magnesium oxide, magnesium hydroxide, calcium hydroxide, polyhydric isocyanate compounds, and others.

As the mold release agent, for example, a fluorine derivative surface active agent or zinc stearate is used.

In the method of manufacturing molded parts in accordance with the invention, the parts to be buried are electronic components, such as winding coils, that generate heat when power is supplied to them. In order to utilize the heat generation by feeding power sufficiently, those components having many heat generating parts are preferred, and thus, for example, motors and transformers are particularly preferred.

As the conductive material of the coil functioning as the heat generating part, a material having a large specific heat is preferred. For example, copper and aluminum both are preferred. Such materials can raise the temperature even from a small quantity of fed power.

As the insulation film of coil winding, for example, polyvinyl formal, nylon, polyester, polyurethane, polyester imide, polyamide, polyimide, or polyamide imide resins may be used. Above all, a material having a high heat resistance is preferred to permit the coil temperature to be raised sufficiently.

The power feeding condition to the coil is determined by the desired surface temperature of the parts. For feeding power, either direct current or alternating current may be used; direct current is particularly preferred when using a coil because the temperature can be raised efficiently. The current or voltage to be applied varies significantly depending on the number of turns of the coil and other variables. It is preferred that the current be in a range of several amperes to tens of amperes, and the voltage ranges from tens of volts to hundreds of volts. If extremely high current or voltage is applied, the coil insulation film may be damaged or the wire may be broken, and therefore the current or voltage to be applied must be determined taking into consideration the material quality of the coil and other factors.

The surface temperature of the parts heated by feeding power is preferred to be as high as possible to decrease the curing time, within a range free from adverse effects on the coil insulation film or the like, above the reaction starting temperature of the thermosetting resin. However, if the temperature is raised too quickly, the molded parts may be cracked or stress may be applied to the coil. Therefore, there must be an adequate temperature control to avoid such problems, but it is not absolutely required that the temperature be higher than the reaction starting temperature of the thermosetting resin.

The thermosetting resin used in the method to manufacture molded parts in accordance with the present invention is not particularly limited, and its examples may include, among others, unsaturated polyester containing unsaturated alkyd resin, epoxy resin, phenol resin, urea resin, silicone resin, melamine resin, diallyl phthalate resin, polyimide, and urethane resin. In particular, a thermosetting resin containing at least one of 2-hydroxyethyl acrylate or 2-hydroxyethyl methacrylate and unsaturated polyester is preferred; this composition decreases the curing time. More preferably, unsaturated polyester containing at least one of 2-hydroxyethyl acrylate and 2-hydroxyethyl methacrylate in an amount of about 1 mol. % to about 80 mol. % of the total crosslinking monomer composition is desired, as this composition greatly decreases the curing time.

The invention is more specifically described below by referring to the following examples.

EXAMPLE 1

An example of the molding composition embodiment of the invention is described below.

Six different liquid resin compositions were obtained by stirring and mixing (a) 100 parts by weight of a mixture of an unsaturated alkyd resin composed of phthalic anhydride, fumaric anhydride and propylene glycol in varying amounts, styrene and 2-hydroxyethyl methacrylate as crosslinking monomers, and polycaprolactone as low shrinking agent, and (b) 1 part by weight of t-butyl peroxy benzoate as a reaction initiator. In the liquid resin composition, the polycaprolactone content is 6.5 wt. %. The molar ratio of the unsaturated alkyd resin to the crosslinking monomer in the liquid resin composition is about 2.8:1. Six different liquid resin compositions were prepared by varying only the ratio of 2-hydroxyethyl methacrylate to styrene. The molar concentration of 2-hydroxyethyl methacrylate in the crosslinking monomer of the six different compositions was 10%, 20%, 30%, 50%, 70%, and 80%, respectively.

Next, using a kneader, 68.3 parts by weight of calcium carbonate as filler, 0.7 part by weight of vinylon chopped strand, 0.9 part by weight of zinc stearate as a parting agent, 0.3 part by weight of carbon powder as coloring matter, and 1.8 parts by weight of polyethylene powder as a surface brightener were mixed in a dry process for about 5 minutes, and a uniformly blended dry mixture was obtained. To 73 parts by weight of this dry mixture, 21.2 parts by weight of the liquid resin composition was gradually added, and then kneaded to form a uniform paste mixture.

To 94.2 parts by weight of this paste mixture, 6.8 parts by weight of glass fiber was uniformly dispersed therein, in a short time, and kneading was finished when the glass fiber was wetted and dispersed uniformly.

In this way, six different molding compositions were obtained.

Using a curastometer, the curing time at 150° C. of each molding composition was measured. Results are shown in Table 1. In this table, H (mol. %) denotes the molar concentration of 2-hydroxyethyl methacrylate in the crosslinking monomer.

There was prepared Comparative Example 1 containing styrene only and no 2-hydroxyethyl methacrylate. The molding composition was prepared in the same manner as in Example 1 in all other respects. In this molding composition free from 2-hydroxyethyl methacrylate, the curing time was similarly measured, and its result is shown together in Table 1. In the table, H (mol. %) of Comparative Example 1 is indicated by 0.

TABLE 1

| H (mol. %)        | 0   | 10  | 20 | 30 | 50 | 70 | 80  |
|-------------------|-----|-----|----|----|----|----|-----|
| Curing time (sec) | 122 | 102 | 71 | 31 | 30 | 35 | 165 |

The following facts are shown in Table 1. The curing time is decreased when the composition contains about 10 mol. % 2-hydroxyethyl methacrylate. At less than about 80 mol. % 2-hydroxyethyl methacrylate, the curing time tended to decrease as the quantity of 2-hydroxyethyl methacrylate increased, but the curing time suddenly increased at about 80 mol. %. In particular, the curing time was decreased when the composition contained about 30% to about 70% 2-hydroxyethyl methacrylate.

That is, using the same kind and amount of reaction initiator in a molding composition wherein the molar concentration of 2-hydroxyethyl methacrylate in the crosslinking monomer is about less than 80 mol. %, the curing time is greatly decreased, so that the productivity of molded parts from the molding composition can be enhanced. In particular, when the molar concentration of 2-hydroxyethyl methacrylate ranges from about 30% to about 70%, the curing time is decreased the most.

If, instead of 2-hydroxyethyl methacrylate, 2-hydroxyethyl acrylate was used, the curing time of the molding composition was decreased almost by the same degree as in Example 1.

EXAMPLE 2

An example of a method of manufacturing molded parts embodiment of the invention is described.

First, a method of preparing a molding composition is explained. Unsaturated polyester was obtained from 65 parts by weight of unsaturated alkyd composed of phthalic anhydride, fumaric anhydride and propylene glycol, 35 parts by weight of styrene, and 0.01 part by weight of methoxy hydroquinone as a polymerization inhibitor, by stirring and dissolving at room temperature. In addition, a low shrinking agent was obtained by stirring and dissolving 40 parts by weight of polydipropylene isophthalate in 60 parts by weight of styrene at room temperature.

A liquid resin composition was obtained by stirring and mixing 71 parts by weight of the unsaturated polyester, 29 parts by weight of the low shrinking agent, and 1 part by weight of 1,1-(t-butyl peroxy) 3,3,5-trimethyl cyclohexane as a polymerization initiator.

Further, 17.8 parts by weight of calcium carbonate as filler, 48.5 parts by weight of aluminum hydroxide, 1.5 parts by weight of zinc stearate as a mold release agent, and 0.4 part by weight of carbon powder as coloring matter were mixed using a kneader in a dry process for 5 minutes. Thus, a uniformly blended dry mixture was obtained.

To 68.2 parts by weight of this dry mixture, 22 parts by weight of the liquid resin composition was gradually added, and kneaded to obtain a uniform paste mixture.

To 90.2 parts by weight of this paste mixture, 9.8 parts by weight of glass fiber was uniformly dispersed and added in a short time; the kneading was finished when the glass fiber was wetted and dispersed uniformly. Thus, a molding composition 1 was prepared.

A manufacturing method of molded parts, using a stator of a motor as an electronic component having a winding coil wound with a conductive wire, using a molding composition of the present invention is explained below.

A schematic perspective view of the stator is shown in FIG. 1. In FIG. 1, the stator comprises an iron core 1 having a 40 mm inner diameter, a 88 mm outer diameter, and a 13 mm laminate thickness, an insulator 3 covering a part of the iron core 1, and a coil 2 having a conductive wire wound on the iron core 1. The coil 2 includes a main winding and an auxiliary winding. The characteristics of the coil 2 are shown in Table 2.

TABLE 2

| Winding division | Wire type | Copper wire dia. | No. of windings | Connection | No. of turns | Resistance (Ω) |
|---|---|---|---|---|---|---|
| Main winding | 1 UEW | φ0.18 | 4 × 2 | Series | 760 | 250 |
| Auxiliary winding | 1 UEW | φ0.19 | 4 × 2 | Series | 800 | 330 |

When feeding power to the coil, terminals of the main winding and auxiliary winding were coupled, and the same voltage was applied to both the main winding and the auxiliary winding.

A method of manufacturing a molded stator by burying the stator and molding is now described. First, thermometers are attached to the stator to measure the coil surface temperature of the stator and the temperature at a position 1.5 mm away from the coil surface (the temperature of the molding composition when filled with molding composition). The thickness of the cured molding composition of a completed molded part is about 15 mm at the position for measuring the coil surface temperature.

The stator was preheated to 90° C., and the heated stator was set in a die heated to 150°C. The molding composition 1 was transferred into the die in which the stator was set. While the die was filled with the molding composition 1 by completely covering the stator, a direct-current voltage of 300 V was applied to the coil. When the coil surface temperature reached 150° C. (30 seconds after filling with the molding composition), feeding power was stopped. When the temperature in the molding composition reached the maximum value (170° C.) (75 seconds after filling with the molding composition), the die was opened and the molded part was taken out. Meanwhile, the temperature in the molding composition suddenly increased from about 120° C. and reached the maximum value.

As Comparative Example 2, using the same molding composition 1 as in the Example 2, the same operation was carried out except for the manner of feeding power to the coil. When the temperature in the molding composition reached the highest temperature (123 seconds after filling with the molding composition), the die was opened, and the molded part was taken out. Thus, the molded part of Comparative Example 2 was prepared.

Further, as Comparative Example 3, a molded part was prepared in the same way except for the manner of feeding power to the coil as in Comparative Example 2. In this case, the molded product was taken out by opening the die the same time the die was opened as in Example 2 (75 seconds after filling with the molding composition).

The appearance of the obtained molded parts was observed.

Table 3 summarizes the time after filling with the molding composition, the coil surface temperature, and temperature changes of the molding composition. In the table, the measuring points C and M indicate the temperature on the coil surface (C) and in the molding composition (M), respectively. At the time of 0 sec, the coil surface temperature and the temperature in the molding composition were about 80° C. This is because the molding composition at room temperature was transferred, and the coil surface temperature once dropped from 90° C. to about 80° C. as cooling took place while the stator was set in the die, and the temperature in the molding composition was raised in the transfer process to reach about 80° C.

TABLE 3

| Measuring point | Time | | | | | |
|---|---|---|---|---|---|---|
| | 0 sec | | 30 sec | | 75 sec | |
| | C | M | C | M | C | M |
| Example 2 | 80 | 77 | 150 | 116 | 150 | 170 |
| Comparative Example 2 | 82 | 78 | 101 | 94 | 122 | 115 |

TABLE 3-continued

| | | | | | | |
|---|---|---|---|---|---|---|
| Comparative Example 3 | 81 | 80 | 103 | 95 | 124 | 118 |

| | Time | | | |
|---|---|---|---|---|
| Measuring | 87 sec | | 123 sec | |
| point | C | M | C | M |
| Example 2 | — | — | — | — |
| Comparative Example 2 | 126 | 120 | 150 | 170 |
| Comparative Example 3 | — | — | — | — |

In this example, 75 seconds after filling the die with the molding composition, the temperature of the molding composition at a point 1.5 mm remote from the coil surface reached the maximum temperature, and the molded part was taken out of the die at this time. The obtained molded part was free from cracks or other appearance defects, and was sufficiently cured; a complete molded part was obtained.

In the case of Comparative Example 2, in 123 seconds after filling with the molding composition, the temperature of the molding composition reached the highest temperature, and it took a longer time to cure the composition.

In the case of Comparative Example 3, several cracks were found on the surface of the obtained molded part; a complete molded part was not obtained.

The following conclusions can be drawn from these results.

After the die containing the electronic component was filled with the molding composition, by feeding power to the coil of the buried electronic component and heating, curing of the molding composition can be promoted. In this example, the curing time was decreased by about 40%.

EXAMPLE 3

Other embodiment of the method of manufacturing molded parts in accordance with the invention is described below.

First, a method of manufacturing a molding composition is explained. By mixing 65 parts by weight of unsaturated alkyd composed of phthalic anhydride, fumaric anhydride and propylene glycol, 35 parts by weight of styrene, and 0.01 part by weight of methoxy hydroquinone as a polymerization inhibitor, and stirring and dissolving at room temperature, mixture A was obtained.

In addition, mixture B was formed by adding 64 parts by weight of 2-hydroxyethyl methacrylate to 36 parts by weight of polydipropylene adipate as a low shrinking agent, stirring and dissolving same at room temperature.

By stirring and mixing 74 parts by weight of mixture A, 26 parts by weight of mixture B, and 1 part by weight of 1,1-(t-butyl peroxy) 3,3,5-trimethyl cyclohexane as a polymerization initiator, a liquid resin composition was obtained.

Next, using a kneader, 17.8 parts by weight of calcium carbonate as filler, 48.5 parts by weight of aluminum hydroxide, 1.5 parts by weight of zinc stearate as a mold release agent, and 0.4 part by weight of carbon powder as coloring matter were mixed in dry process for 5 minutes. In this way, a uniformly blended dry mixture was obtained. To 68.2 parts by weight of this mixture, 22 parts by weight of the previously mixed liquid resin composition was gradually added and kneaded; a uniform paste mixture was obtained.

To 90.2 parts by weight of this paste mixture, 9.8 parts by weight of glass fiber was uniformly dispersed and added in a short time; kneading was finished when the glass fiber was wetted and dispersed uniformly. Thus molding composition 2 was prepared.

By changing the liquid resin composition of the molding composition 2 as follows, molding composition 3 was prepared using in all other respects the same composition and method.

First, 63.5 parts by weight of unsaturated alkyd composed of phthalic anhydride, fumaric anhydride and propylene glycol, 27 parts by weight of styrene, 9.5 parts by weight of 2-hydroxyethyl methacrylate, and 0.01 part by weight of methoxy hydroquinone as a polymerization inhibitor were mixed, and stirred and dissolved at room temperature. Thus, mixture C was obtained.

On the other hand, 36 parts by weight of polydipropylene adipate as a low shrinking agent were stirred and dissolved at room temperature in 64 parts by weight of 2-hydroxyethyl methacrylate to form mixture D.

By stirring and mixing mixture C, 26 parts by weight of mixture D, and 1 part by weight of 1,1-(t-butyl peroxy) 3,3,5-trimethyl cyclohexane, a liquid resin composition was obtained. Mixing this liquid resin composition with the same various fillers as mentioned above, molding composition 3 was prepared.

Using these two kinds of molding composition 2 and molding composition 3, molded parts were prepared in the same fashion as in Example 2.

Table 4 summarizes the time from injection of the molding composition into the die, the coil surface temperature, and temperature changes in the molding composition. Table 4 also shows the result of experiment of the molding composition 1 explained in Example 2. In molding compositions 1, 2, 3, the ratio of 2-hydroxyethyl methacrylate to styrene is 100:0, 65:35, and 50:50, respectively.

In the case of using molding composition 2, 55 seconds after filling with the molding composition, the temperature in the molding composition reached the highest temperature, and the die was opened and the molded part was taken out.

In the case of using molding composition 3, 45 seconds after filling with the molding composition, the temperature in the molding composition reached the highest temperature, and the die was opened and the molded part was taken out.

TABLE 4

| | Time | | | | | |
|---|---|---|---|---|---|---|
| Measuring | 0 sec | | 30 sec | | 45 sec | |
| point | C | M | C | M | C | M |
| Molding composition 1 | 80 | 77 | 150 | 116 | 152 | 134 |
| Molding composition 2 | 83 | 77 | 148 | 118 | 153 | 151 |
| Molding composition 3 | 82 | 79 | 151 | 120 | 153 | 168 |

| | Time | | | |
|---|---|---|---|---|
| Measuring | 55 sec | | 75 sec | |
| point | C | M | C | M |
| Molding composition 1 | 151 | 146 | 150 | 170 |

TABLE 4-continued

| | | | | |
|---|---|---|---|---|
| Molding composition 2 | 151 | 171 | — | — |
| Molding composition 3 | — | — | — | — |

All of the obtained molded parts were free from cracks, and complete molded parts were obtained. Moreover, as the rate of replacing styrene in the molding composition with 2-hydroxyethyl methacrylate increased, the time required for the temperature of the molding composition to reach the maximum temperature decreased, and the curing time decreased also.

EXAMPLE 4

Figure 2:
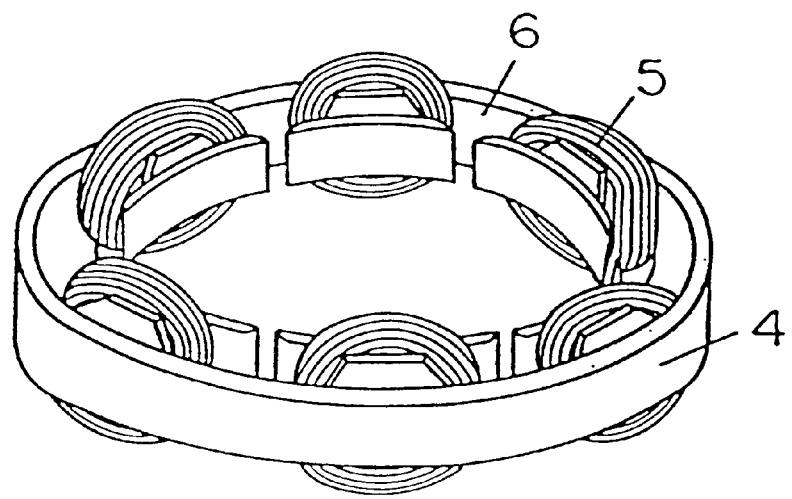
FIG. 2 is a schematic perspective view of a stator of a motor used in a method of manufacturing molded parts in other embodiment of the invention.

In this example, molding composition 3 in Example 3 was used. As the electronic component having the coil, a stator winding the coil differently from that employed in Example 2 was used. A schematic perspective view of the stator used in this example is shown in FIG. 2. In this stator, the coil 5 was wound on the iron core 4 having a 51 mm inner diameter, a 86 mm outer diameter, and an 11 mm laminate thickness by the number of turns listed in Table 5.

TABLE 5

| Winding division | Wire type | Copper wire dia. | No. of turns |
|---|---|---|---|
| Winding | 1 UEW | φ0.45 | 175 |

The surface temperature of the coil 5 is the temperature in the intermediate space of the mutually adjacent coils (depicted as the temperature measuring position 6 in FIG. 2); a thermometer was attached to the stator to measure the temperature in this area. The measuring position 6 is to measure the temperature of the molding composition when the stator is filled with the molding composition. The thickness of the cured resin layer of the resulting molded part is about 14 mm in the coil surface temperature measuring area.

The stator was preheated to 90° C. and the heated stator was set in a die heated to 150° C. Molding composition 3 was transferred into the die in which the stator was set. While the die was filled with molding composition 3 by completely covering the stator, a direct-current voltage of 300 V was applied to the coil to heat it. When the coil surface temperature reached 150° (82 seconds after filling with the molding composition), power feeding was stopped. When the temperature in the molding composition reached the maximum value (about 170° C.) (127 seconds after filling with the molding composition), the die was opened and the molded part was taken out. Meanwhile, the temperature in the molding composition suddenly increased from about 120° C. and reached the maximum value.

As Comparative Example 4, the same operation was carried out except for the manner of feeding power to the coil. When the temperature in the molding composition reached the highest temperature (163 seconds after filling with the molding composition), the die was opened, and the molded part was taken out.

Thus, the molded part of Comparative Example 4 was prepared.

Further, as Comparative Example 5, a molded part was prepared in same manner except for the process of feeding power to the coil as in Comparative Example 4. In this case, the molded product was taken out by opening the die at the same time the die was opened in Example 4 (127 seconds after filling with the molding composition).

The appearance of the obtained molded parts was observed.

Table 6 summarizes the time after filling with the molding composition, the coil surface temperature, and temperature changes of the molding composition.

In the table, the measuring points C and M indicate the temperature on the coil surface (C) and in the molding composition (M), respectively.

TABLE 6

| | Time | | | | | |
|---|---|---|---|---|---|---|
| Measuring | 0 sec | | 82 sec | | 127 sec | |
| point | C | M | C | M | C | M |
| Example 4 | 82 | 76 | 151 | 122 | 153 | 167 |
| Comparative Example 4 | 81 | 74 | 99 | 92 | 118 | 112 |
| Comparative Example 5 | 82 | 75 | 101 | 94 | 119 | 114 |

| | Time | | | |
|---|---|---|---|---|
| Measuring | 132 sec | | 163 sec | |
| point | C | M | C | M |
| Example 4 | — | — | — | — |
| Comparative Example 4 | 123 | 121 | 152 | 166 |
| Comparative Example 5 | — | — | — | — |

In this embodiment, the molding composition reached its maximum temperature 127 seconds after filling with the molding composition, and the molded part was taken out of the die at this time. The obtained molded part was free from cracks or other defects, and was sufficiently cured; a complete molded part was obtained.

In the case of Comparative Example 4, in 163 seconds after filling with the molding composition, the temperature of the molding composition reached the highest temperature, and it took a longer time to cure. However, there was no problem in the appearance of the molded part.

In the case of Comparative Example 5, several cracks were found on the obtained molded part; a complete molded part was not obtained.

As the results establish, after filling the electronic component with the molding composition, by feeding power to the coil of the buried electronic component and heating, curing of the molding composition can be promoted. In this embodiment, the curing time was decreased by about 20%.

Although the above examples use, as the part having the coil by winding a conductive wire a motor stator, the invention is not limited to same; any transformer part having a coil winding a conductive wire is usable. As the thermosetting resin, unsaturated polyester was used, but the invention is not limited to same; epoxy resin and phenol resin are also usable.

Thus, the curing time can be decreased by using the molding composition of the invention. As a result, the molding cycles within a specific time are increased, and productivity is enhanced. Also by employing the method of manufacturing molded parts of the invention, the curing reaction of the resin is promoted, and the curing time is substantially decreased.

By the use of an unsaturated polyester containing at least one of 2-hydroxyethyl acrylate or 2-hydroxyethyl methacrylate, the above effects are particularly excellent. Such method of manufacturing the molding composition and molded parts can be easily executed, and parts productivity can be enhanced notably.

What is claimed is:

1. A method of manufacturing a molded product comprising the steps of
    (a) covering with a heat-curable molding composition the outside of an electronic component that (1) can be heated and (2) has a coil formed by winding a conductive wire, said heat-curable molding composition comprising an unsaturated alkyd resin and a crosslinking monomer to be crosslinked to said unsaturated alkyd resin, said crosslinking monomer including (1) a first crosslinking monomer having each of an ethylenically unsaturated group, a carboxyl ground, and a hydroxyl group and being at least one of 2-hydroxyethyl acrylate and 2-hydroxyethyl methacrylate and (2) a second crosslinking monomer, said first crosslinking monomer being present in an amount of about 1 mol. % to about 80 mol. % of the total of said first crosslinking monomer and said second crosslinking monomer,
    (b) feeding power to said electronic component to cause said coil to generate heat in said electronic component, and
    (c) curing said heat-curable molding composition by the heat generated by said electronic component.

2. The method of claim 1, wherein said second crosslinking monomer includes styrene.

3. A method of manufacturing a molded product comprising the steps of
    (a) covering with a heat-curable molding composition the outside of an electronic component that (1) can be heated and (2) has a coil formed by winding a conductive wire, said heat-curable molding composition comprising an unsaturated alkyd resin and a crosslinking monomer to be crosslinked to said unsaturated alkyd resin, said crosslinking monomer including (i) a first crosslinking monomer having each of an ethylenically unsaturated group, a carboxyl ground, and a hydroxyl group and being at least one of 2-hydroxyethyl acrylate and 2-hydroxyethyl methacrylate and (ii) a second crosslinking monomers, said first crosslinking monomer being present in an amount of about 30 mol. % to 70 mol. % of the total of said crosslinking monomer,
    (b) feeding power to said electronic component to cause said coil to generate heat in said electronic component, and
    (c) curing said heat-curable molding composition by the heat generated by said electronic component causing a crosslinking reaction of said unsaturated alkyd resin, said first crosslinking monomer, and said second crosslinking monomer.

4. A method of manufacturing a molded product comprising the steps of
    (a) covering with a heat-curable molding composition the outside of an electronic component that (1) can be heated and (2) has a coil formed by winding a conductive wire, said heat-curable molding composition comprising an unsaturated alkyd resin and a crosslinking monomer to be crosslinked to said unsaturated alkyd resin, said crosslinking monomer including (i) a first crosslinking monomer having each of an ethylenically unsaturated group, a carboxyl ground, and a hydroxyl group and being at least one of 2-hydroxyethyl acrylate and 2-hydroxyethyl methacrylate and (ii) a second crosslinking monomer, wherein said second crosslinking monomer includes styrene and the total of said first crosslinking monomer and said second crosslinking monomer is from about 90 mol. % to 100 mol. % of the total of said crosslinking monomer,
    (b) feeding power to said electronic component to cause said coil to generate heat in said electronic component, and
    (c) curing said heat-curable molding composition by the heat generated by said electronic component causing a crosslinking reaction of said unsaturated alkyd resin, said first crosslinking monomer, and said second crosslinking monomer.

* * * * *